US009218648B2

(12) United States Patent
McCloskey et al.

(10) Patent No.: US 9,218,648 B2
(45) Date of Patent: Dec. 22, 2015

(54) FOURIER DOMAIN BLUR ESTIMATION METHOD AND SYSTEM

(75) Inventors: Scott McCloskey, Minneapolis, MN (US); Yuanyuan Ding, Newark, DE (US); Kwong Wing Au, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1507 days.

(21) Appl. No.: 12/606,780

(22) Filed: Oct. 27, 2009

(65) Prior Publication Data

US 2011/0096180 A1    Apr. 28, 2011

(51) Int. Cl.
*H04N 5/228* (2006.01)
*G06T 5/00* (2006.01)
*G06T 5/10* (2006.01)

(52) U.S. Cl.
CPC . *G06T 5/003* (2013.01); *G06T 5/10* (2013.01); *G06T 2207/20201* (2013.01)

(58) Field of Classification Search
CPC ............... G06T 2207/20201; G06T 5/003; G06T 5/10
See application file for complete search history.

(56) References Cited

U.S. PATENT DOCUMENTS

| | | | | |
|---|---|---|---|---|
| 5,497,430 | A | 3/1996 | Sadovnik et al. | 382/156 |
| 7,319,783 | B2 | 1/2008 | Dowski, Jr. et al. | 382/128 |
| 7,558,763 | B2 | 7/2009 | Zhao et al. | 706/14 |
| 7,568,802 | B2 | 8/2009 | Phinney et al. | 351/246 |
| 2006/0061653 | A1* | 3/2006 | Hampapur et al. | 348/143 |
| 2007/0122049 | A1 | 5/2007 | Dowski et al. | 382/254 |
| 2007/0258706 | A1* | 11/2007 | Raskar et al. | 396/52 |
| 2008/0013801 | A1 | 1/2008 | Reed et al. | 382/118 |

OTHER PUBLICATIONS

Qi et al., "Motion Deblurring for Optical Character Recognition", Proceedings of the 2005 Eight International Conference on Document Analysis and Recognition (ICDAR '05), Aug. 31, pp. 389-393.*
Moghaddam et al., "Finding Point Spread Function of motion blur using Radon transform and modeling the motion length", Proceedings of the Fourth IEEE International Symposium on Signal Processing and Information Technology, Dec. 18-21, 2004, pp. 314-317.*

(Continued)

*Primary Examiner* — Dave Czekaj
*Assistant Examiner* — Md Haque
(74) *Attorney, Agent, or Firm* — Kermit D. Lopez; Luis M. Ortiz; Ortiz & Lopez, PLLC (57) ABSTRACT

A method and system for estimating motion blur of an image associated with a moving object. The direction of one-dimensional motion blur may be estimated by inspecting a power spectrum associated with the image. A radon transform with respect to the image power spectrum is computed in the direction of the motion blur. A family of kernels with respect to the one-dimensional motion blur may then be defined utilizing a shutter triggering sequence associated with an image capturing device. The family of kernels may be modeled utilizing a modulation transfer function (MTF). Each modulation transfer function may be compared with the radon transform of the power spectrum associated with the image via a correlation function. The kernel with highest correlation with respect to the radon transform of the image power spectrum may be employed for de-blurring the image.

20 Claims, 4 Drawing Sheets

(56) References Cited

OTHER PUBLICATIONS

Agrawal, A. et al., "Coded Exposure Deblurring: Optimized Codes for PSF Estimation and Invertibility," *IEEE Conference on Computer Vision and Pattern Recognition* (2009) Piscataway, NJ, Jun. 20, pp. 2066-2073.

Arashloo, S. R. et al., "Fine Estimation of Blur Parameters for Image Restoration," *2007 15th International Conference Digital Signal Processing*, Jul. 1, pp. 427-430.

Qi, X. Y. et al., "Motion Deblurring for Optical Character Recognition," *Proceedings of the 2005 Eight International Conference on Document Analysis and Recognition (ICDAR '05)*, Aug. 21, pp. 389-393.

Raskar, R. et al., "Coded Exposure Photography: Motion Deblurring using Fluttered Shutter," *ACM Transaction on Graphics* (2006) 25(3):795-804.

EP Search Report for EP Application No. 10172444.1 dated Nov. 22, 2010.

M. Lepley, J. Marques, N. Nill, N. Orlans, R. Rivers, R. White; Mitre Technical Report-State of the Art Biometrics Excellence Roadmap: Certified Products List (CPL) Expansion: The Way Ahead, Oct. 2008, v. 1.2.

* cited by examiner

FOURIER DOMAIN BLUR ESTIMATION METHOD AND SYSTEM

GOVERNMENT RIGHTS

The United States Government has certain rights in this invention pursuant to Contract No. W91CRB-09-C-0013 between the U.S. Army RDECOM (Research Development and Engineering Command) and Honeywell International Inc.

TECHNICAL FIELD

Embodiments are generally related to image processing methods and systems. Embodiments also relate in general to the field of computers and similar technologies and in particular to software utilized in this field. Embodiments are additionally related to the estimation of motion blur in digital images.

BACKGROUND OF THE INVENTION

Images acquired utilizing image capturing devices such as, for example, a digital camera, may require image processing before the image is employed for an intended task (e.g., iris matching). Image degradation, also known as motion blur, is common in images recorded utilizing digital cameras in industrial and scientific applications, which often require monitoring of high-speed events. Motion blur is also a problem stemming from the use of surveillance cameras that track moving objects and cameras mounted on a moving vehicle such as, for example, an aircraft. Motion blur significantly degrades the visual quality of an image and must be prevented during image capturing or mitigated by post-processing of the image to remove the motion blur. Restoration of a blurred and noisy image sequence potentially increases the amount of information that a human observer can obtain from an image sequence.

Most prior art approaches are capable of restoring degraded images, but only to an extent. One prior art approach, for example, employs additional hardware and special sensors in order to estimate and correct the motion of the camera during the exposure time. Another prior art technique involves the use of an imaging system that detects a single motion blur kernel (also referred as "point spread function") in order for the entire image to be restored as the original image, but only up to a particular level of accuracy. Such an image restoration approach utilizes prior knowledge that assumes a simple camera shutter open/close sequence, which restricts the estimation to a much smaller set of kernels. The use of such an approach is difficult in establishing a universal model for the blur estimation process.

Based on the foregoing, it is believed that a need exists for an improved method and system for estimating motion blur associated with an image captured from an image capturing device. A need also exists for explicitly estimating a family of kernels as a function of a shuttering sequence, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiment to provide for an improved image processing method and system.

It is another aspect of the disclosed embodiment to provide for an improved method and system for estimating motion blur associated with an image.

It is a further aspect of the disclosed embodiment to provide for an improved method for estimating a family of kernels as a function of a shuttering sequence.

The aforementioned aspects and other objectives and advantages can now be achieved as described herein. A method and system for estimating motion blur of an image associated with a moving object is disclosed herein. A direction of one-dimensional motion blur may be estimated by inspecting a power spectrum associated with the image. A radon transform with respect to the image power spectrum can be computed in the direction of the motion blur. A family of kernels with respect to the one-dimensional motion blur may then be defined utilizing a shutter triggering sequence associated with an image capturing device (e.g. camera). The family of kernels may be parameterized with respect to the direction, speed, and acceleration of the moving object, and modeled utilizing a modulation transfer function (MTF). Each modulation transfer function may be compared with the radon transform of the power spectrum associated with the image via a correlation function. The kernel having the highest correlation with respect to the radon transform of the image power spectrum may be employed for de-blurring the image.

The image capturing device can include the use of a shutter assembly or an electronic shutter, which may be employed to capture the image of the moving object. The family of kernels may be empirically characterized when modeling of the kernel(s) becomes inappropriate. The estimated motion blur parameters can be utilized in conjunction with a de-blurring method and/or software component (e.g., a de-blurring algorithm) to reduce the motion blur in the captured image and generate a motion blur corrected image.

The disclosed embodiments may be employed to determine different point spread functions for various regions associated with the image in order to provide effective motion blur estimation. Such a motion blur estimation approach may be implemented by extracting the blur function automatically from the acquired image via a direct and expeditious process that generates stable output.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed embodiments may be employed to estimate motion blur associated with an image with respect to a moving object acquired from an image capturing device to restore the image with a high degree of efficiency. The estimated motion blur parameters may be employed to reduce the motion blur in the captured image thereby to generate a motion blur corrected image.

Figure 1:
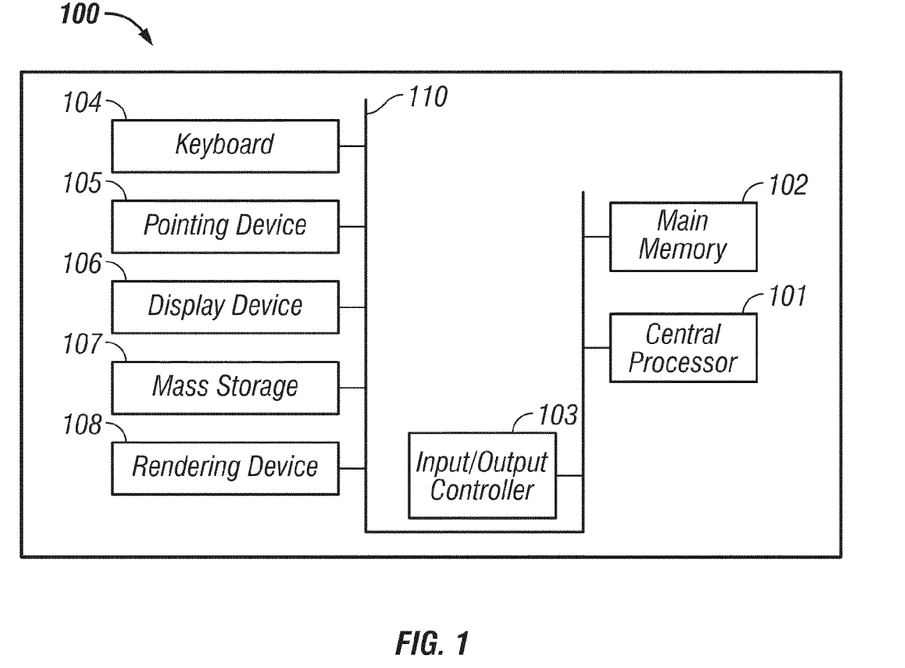
FIG. 1 illustrates a schematic view of a data-processing system in which an embodiment may be implemented.
Figure 2:
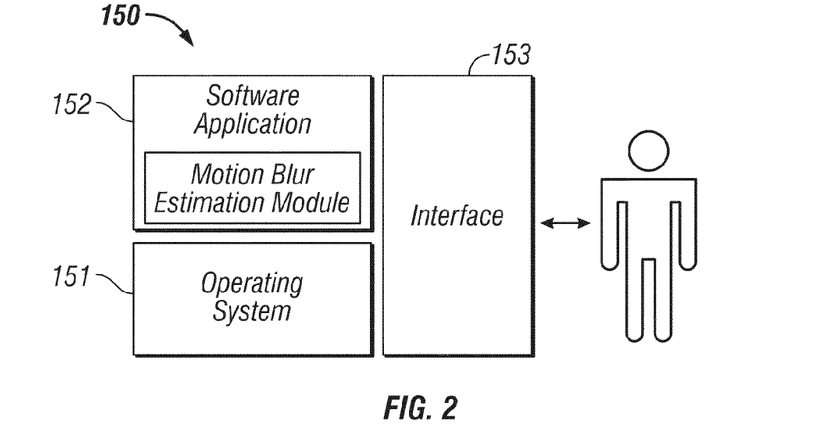
FIG. 2 illustrates a schematic view of a software system including an operating system, application software, and a user interface for carrying out an embodiment.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device; or the like), a display device 106, and a mass storage 107 (e.g., hard disk). Additional input/output devices, such as a rendering device 108 (e.g., printer, scanner, fax machine, etc), for example, may be associated with the data-processing system 100 as desired. As illustrated, the various components of data-processing system 100 communicate electronically through a system bus 110 or similar architecture. The system bus 110 may be a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through a user interface 153; these inputs may then be acted upon by the data-processing system 100 in accordance with instructions from an operating module 151 and/or an application module 152.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term "module" as utilized herein may refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application, such as a computer program designed to assist in the performance of a specific task such as, for example, estimating blur motion with respect to a moving object, estimating blur parameters, reducing motion blur, generating a motion blur corrected image, etc.

The interface 153, which is preferably a graphical user interface (GUI), can serve to display results, whereupon a user may supply additional inputs or terminate a particular session. In some embodiments, operating system 151 and interface 153 can be implemented in the context of a "Windows" system. It can be appreciated, of course, that other types of operating systems and interfaces may be alternatively utilized. For example, rather than a traditional "Windows" system, other operation systems such as, for example, Linux or another computer OS (Operating System) may also be employed with respect to operating system 151 and interface 152. The software application 152 may include, for example, a motion blur estimation module (e.g., also see module 152 shown in FIG. 5) for estimating motion blur associated with the image. Software application module 152, on the other hand, can include instructions such as the various operations described herein with respect to the various components and modules described herein such as, for example, the instructions depicted in FIG. 4 with respect to blocks 410, 420, 430, 440, 450 and 460 of method 400.

The description herein is presented with respect to particular example embodiments, which may be implemented in some cases in the context of a data-processing system such as, for example, data- processing system 100 and computer software system 150 illustrated herein with respect to FIGS. 1-2. Such embodiments, however, are not limited to any particular application or any particular computing or data-processing environment. Instead, those skilled in the art will appreciate that the disclosed system and method may be advantageously applied to a variety of system and application software. Moreover, example embodiments can be implemented via a variety of different computing platforms, such as, for example, Macintosh, UNIX, LINUX, and the like.

Figure 3:
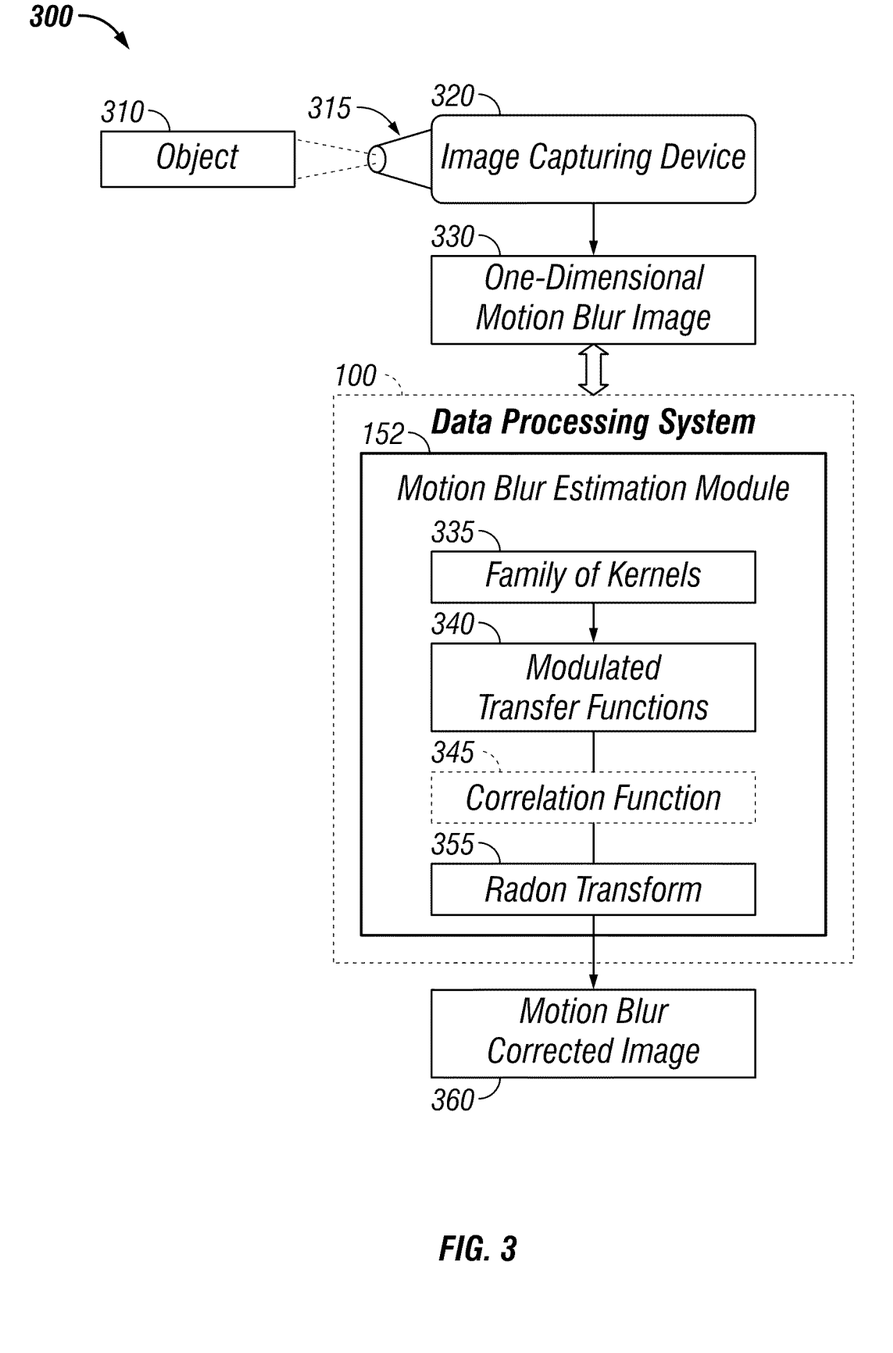
FIG. 3 illustrates a block diagram of a motion blur estimation system, in accordance with the disclosed embodiments.

FIG. 3 illustrates a block diagram of an imaging system 300 associated with a motion blur estimation module 152, in accordance with the disclosed embodiments. Note that in FIGS. 1-5, identical or similar parts are generally indicated by identical reference numerals. The imaging system 300 generally includes an image capturing device 320 associated with a shutter assembly 315. The image capturing device 320 described herein may be, for example, a digital camera, a camcorder, or an electronic device with video capturing capabilities, depending upon design considerations. The image capturing device 320 captures an image 330 of a reflection associated with a moving object 310. The imaging system 300 may be employed in association with various image-based recognition systems for identifying an object within an environment.

The captured image 330 (e.g., one-dimensional) represents an image scene that defines the original object 310. The image 330 obtained from the image capturing device 320 may include motion blur. In general, motion blur may be a common aspect that affects the quality of the image 330 recorded by the high speed image capturing device 320 utilized in a variety of industrial and scientific applications that require monitoring of high-speed events. The embodiments disclosed herein may be employed for estimating the motion blur associated with the image 330 via a motion blur estimation module 152. The motion blur estimation module 152 may be a software application including computer executable instructions executed by the data processing system 100, or other computing system environment. The motion blur estimation module 152 may run as a stand-alone digital video tool, an embedded function, or may be incorporated into other digital image/video applications to provide enhanced functionality.

The shutter triggering information obtained from a triggering sequence with respect to the shutter assembly 315 may be employed to define a family of kernels 335 of one-dimensional motion blur associated with the single image 330. Note that as utilized herein, the term "kernel" may also refer to point spread function (PSF). The point spread function may be estimated to obtain a sharp image 360 from the linear motion blurred image 330. When the object 310 is divided into discrete point objects of varying intensity, the image 330 may be computed as a sum of the PSF of each point. In general, the point spread function describes the response of the imaging system 300 to a point source or point object. A more general term for the PSF is a system's impulse response, the PSF being the impulse response of the imaging system 300. The degree of spreading (blurring) of the point object 310 is a measure for the quality of the imaging system 300. As the PSF is typically determined entirely by the imaging system 300, the entire image can be described by knowing the optical properties of the system 300. This process is usually formulated by a convolution equation.

The family of kernels 335 may be parameterized with respect to the direction, speed, and acceleration of the moving object 310, and may be modeled if the flutter sequence is known. Additionally, the family of kernels 335 may be empirically characterized when modeling is inappropriate. The direction of motion blur in the image 330 may be determined by inspecting the power spectrum of the image 330. A radon transform 355 for the power spectrum of the blur image 330 may be computed in the direction of the motion blur. If a function $f$ represents an unknown density, then the Radon transform represents the scattering data obtained as the output of the imaging system 300. Hence, the inverse of the Radon transform can be employed to reconstruct the original density from the scattering data. The Radon transform is closely related to the Fourier transform.

The family of kernels 335 may be modeled utilizing a modulation transfer function (MTF) 340. Mathematically, the MTF 340 is the modulus of an optical transfer function (OTF), which is the two-dimensional Fourier transform of the point spread function 335 of the imaging system 300. The OTF is a complex function whose modulus (MTF) has the value unity at zero spatial frequency. More particularly, the MTF 340 is a graph (i.e., a set of discrete modulation factors) that represents the image contrast relative to the object contrast on the vertical axis over a range of spatial frequencies on the horizontal axis, where high frequency corresponds to small detail associated with the object 310.

Each modulation transfer function 340 may be compared with the radon transform 355 of the power spectrum associated with the image 330 via a correlation function 345. A correlation function is the correlation between random variables at two different points in space or time, usually as a function of the spatial or temporal distance between the points. Correlation functions are a useful indicator of dependencies as a function of distance in time or space and they can be employed to assess the distance required between sample points for the values to be effectively uncorrelated. The kernel with highest correlation with respect to the radon transform 355 of the image power spectrum may be employed for de-blurring the image 330 in order to generate a motion blur corrected image 360. The motion computation, point spread function estimation, and correlation function may be performed utilizing the motion blur estimation module 152 associated with the data-processing system 100.

Figure 4:
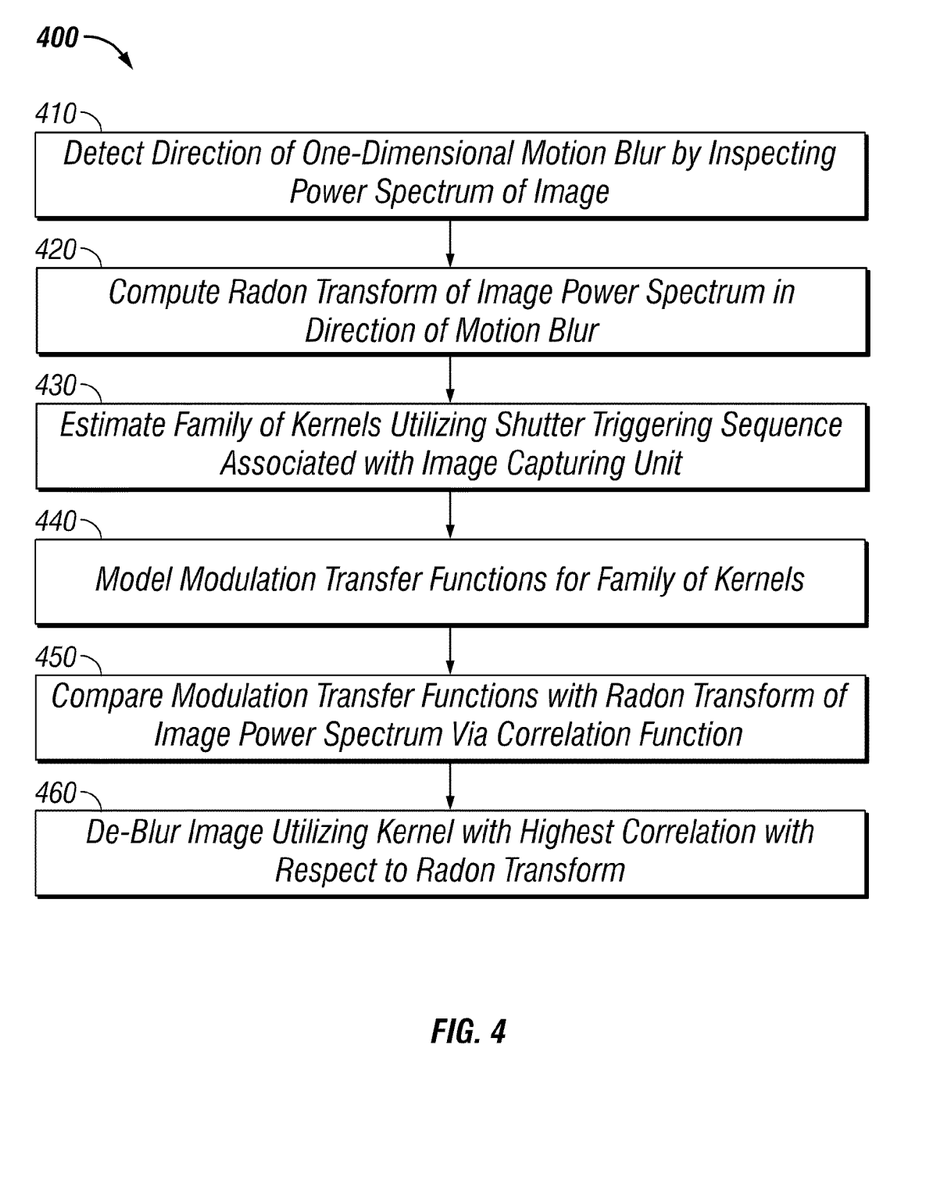
FIG. 4 illustrates a detailed flow chart of operation illustrating logical operational steps of a method for estimating motion blur in an image with respect to a moving object, in accordance with the disclosed embodiments.

FIG. 4 illustrates a detailed flow chart of operation illustrating logical operational steps of a method 400 for estimating motion blur in the image 330 with respect to the moving object 310, in accordance with the disclosed embodiments. Note that the method 400 can be implemented in the context of a computer-useable medium that contains a program product. The method 400 may be implemented in the context of a computer-usable medium containing a program product (e.g., software application, software modules, etc).

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including, for example, Ethernet, the Internet, wireless networks, and other networked systems. Thus, the method 400 described herein can be deployed as process software in the context of a computer system or data-processing system as that depicted in FIGS. 1-2.

Initially, the direction of motion blur with respect to the image 330 obtained by the image capturing device 320 may be detected by inspecting the power spectrum of the image 330, as illustrated at block 410. The direction of motion blur in the image may be determined by assuming that the latent sharp image 360 is not highly anisotropic. The radon transform 355 of the power spectrum associated with the image 330 may be computed in the direction of motion blur, as depicted at block 420. The family of kernels 335 may be estimated utilizing the triggering sequence generated by the shutter assembly 315 associated with the image capturing device 320, as indicated at block 430. The modulation transfer functions 340 may be modeled for the family of kernels 335, as illustrated at block 440. The modeled modulation transfer functions 340 may be further compared with the radon transform 355 via the correlation function 345, as depicted at block 450. The kernel 335 with a highest correlation with respect to the radon transform 355 may be employed for de-blurring the image 330, as depicted in block 460.

Figure 5:
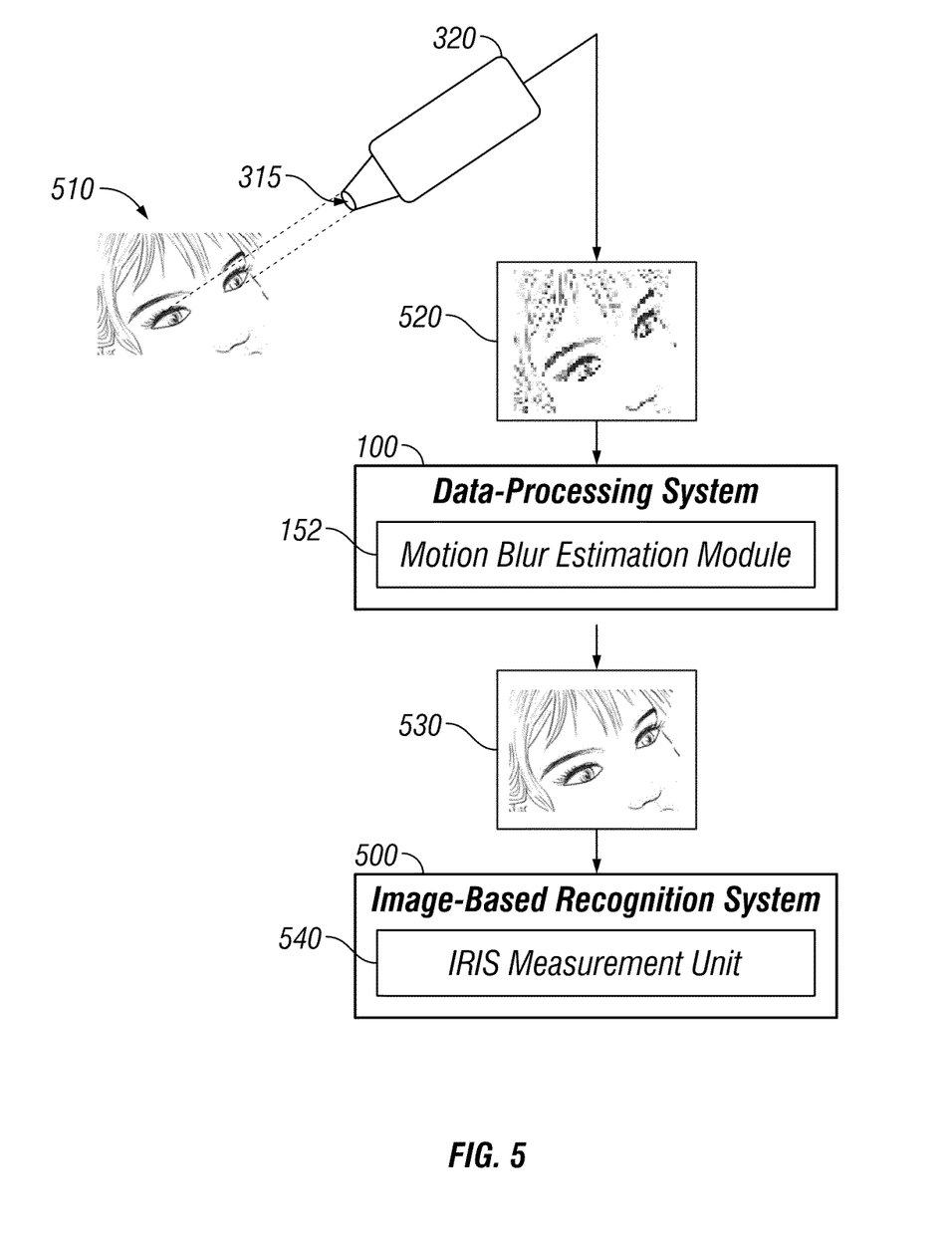
FIG. 5 illustrates an image-based recognition system associated with the motion blur estimation module, in accordance with the disclosed embodiments.

FIG. 5 illustrates an image-based recognition system 500 associated with the motion blur estimation module 152, in accordance with an exemplary embodiment. The motion blur estimation module 152 associated with the data-processing system 100 generates a motion blur corrected image 530 of a subject 510 for use in a variety of image-based recognition systems such as, for example, an iris measurement unit 540. The iris recognition unit 540 may have major components which include iris localization, iris map feature extraction, encoding, and enroll/matching. In image acquisition, a digital image 520 capturing the eye of the subject 510 may be obtained at multiple resolutions, eye orientation, and transition, under variant lighting illumination and in a noise laden environment utilizing the image capturing device 320. The motion blur estimation module 152 may perform post image processing with respect to the image 520 obtained from the image capturing device 320 to significantly improve the resolution of the captured image 520.

The one-dimensional motion blur associated with the image 520 attenuates high frequency information in the direction of motion, which amounts to a detection of the direction in which middle and high frequencies are most muted. The motion blur estimation module 152 determines different point spread functions 335 for different regions associated with the image 520. By convolution theorem, the radon transform 355 may be a multiple of the power spectrum of the latent sharp image and an envelope determined by the kernel 335. The modulation transfer function 340 may be modeled for each point spread function 335 that arises from different velocities and degrees of acceleration with respect to the moving subject 510. The modulation transfer function 340 can be calculated by multiplying the modulation factors of the components at each spatial frequency.

The modulation transfer function 340 may be a function of the optical components and degradation associated with the electronic acquisition and processing components. Each modulation transfer function 340 may be compared with the radon transform 355 of the power spectrum associated with the image 520 via the correlation function 345. The kernel with highest correlation with respect to the radon transform 355 of the image power spectrum may be employed for de-blurring the image 520. The motion blur estimation module 152 provides effective motion blur estimates in association with the subject 510.

The blur estimation module 152 may correct the motion blur image 330 degraded by the isotropic blur that is evident in out-of-focus images and in those produced utilizing long-distance imaging. Image correction in the system 300 may be accomplished by extracting the blur function automatically from the acquired image 330 via a direct and expeditious process that generates stable output. The quality of the corrected image typically exceeds that of the existing techniques. The method and system described herein may be incorporated into any type of image capturing device prone to isotropic blurring and employed in the increasingly common long-distance surveillance systems prevalent in security/homeland security applications.

Based on the foregoing, it can be appreciated, that in accordance with the disclosed embodiments, a method is disclosed for estimating motion blur. Such a method includes detecting a direction of a motion blur with respect to an image by inspecting a power spectrum associated with the image in order to thereafter compute a transform with respect to the power spectrum in the direction of the motion blur. Such a method further includes estimating one or more kernels with respect to the motion blur utilizing a shutter triggering sequence associated with an image capturing device and modeling the kernels utilizing one or more modulation transfer functions. Such a method can also include comparing the modulation transfer function(s) associated with the kernels to the transform via a correlation function in order to determine a kernel associated with a highest correlation relative to the radon transform of the power spectrum and thereby estimate data indicative of the motion blur.

Additionally, such a method can also include de-blurring the image with respect to a moving object utilizing the kernel associated with the highest correlation to generate a motion blur corrected image. Additional steps may include: determining the kernel(s) for a group of regions associated with the image; modeling the modulation transfer function(s) to empirically characterize the kernel(s); and estimating the kernel(s) based on velocity and acceleration associated with the moving object. Note that in such a method, the transform can constitute a radon transform. Additionally, the motion blur with respect to the image may be a one-dimensional motion.

Based on the foregoing, it can be appreciated, that in accordance with the disclosed embodiments, a system is disclosed for estimating motion blur. Such a system may include a processor, a data bus coupled to the processor, and a computer-usable medium embodying computer code, the computer-usable medium being coupled to the data bus. The computer program code can include: instructions executable by the processor and configured for detecting a direction of a motion blur with respect to an image by inspecting a power spectrum associated with the image in order to thereafter compute a transform with respect to the power spectrum in the direction of the motion blur; estimating one or more kernels with respect to the motion blur utilizing a shutter triggering sequence associated with an image capturing device and modeling the kernel(s) utilizing at least one modulation transfer function; and comparing the modulation transfer function(s) associated with the kernel(s) to the transform via a correlation function in order to determine a kernel associated with the highest correlation relative to the radon transform of the power spectrum and thereby estimate data indicative of the motion blur.

Such a system may also include that are further configured for de-blurring the image with respect to a moving object utilizing the kernel associated with the highest correlation to generate a motion blur corrected image and for determining the kernel(s) for a group of regions associated with the image. Such instructions may be further configured for modeling the modulation transfer function(s) to empirically characterize the kernel(s) and also estimating the kernels based on velocity and acceleration associated with the moving object. In the context of such a system, the aforementioned transform may comprise a radon transform and the motion blur with respect to the image may be a one-dimensional motion.

It can be further appreciated, based on the foregoing and in accordance with the disclosed embodiments, that a computer-usable for estimating motion blur is also disclosed, wherein the computer-usable medium embodies computer program code and the computer program code includes: computer executable instructions configured for detecting a direction of a motion blur with respect to an image by inspecting a power spectrum associated with the image in order to thereafter compute a transform with respect to the power spectrum in the direction of the motion blur; estimating one or more kernels with respect to the motion blur utilizing a shutter triggering sequence associated with an image capturing device and modeling the kernel(s) utilizing at least one modulation transfer function; and comparing the modulation transfer function(s) associated with the kernels to the transform via a correlation function in order to determine a kernel associated with the highest correlation relative to the radon transform of the power spectrum and thereby estimate data indicative of the motion blur.

In such a computer-usable medium, the embodied computer program code can further include computer executable instructions configured for comprising de-blurring the image with respect to a moving object utilizing the kernel associated with the highest correlation to generate a motion blur corrected image and for determining the kernels for one or more regions associated with the image. The embodied computer program code may further include computer executable instructions configured for modeling the modulation transfer function(s) to empirically characterize the kernels and computer executable instructions configured for estimating the kernels based on velocity and acceleration associated with the moving object. Additionally, in the context of such a computer-usable medium, the aforementioned transform may constitute a radon transform and the motion blur with respect to the image may be a one-dimensional motion.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for estimating motion blur, said method comprising:
   detecting a direction of a motion blur with respect to an image by inspecting a power spectrum associated with said image;
   computing a transform with respect to said power spectrum in said direction of said motion blur;
   estimating a plurality of kernels with respect to said motion blur according to a shutter triggering sequence associated with an image capturing device and modeling said plurality of kernels utilizing at least one modulation transfer function; and
   comparing said at least one modulation transfer function associated with said plurality of kernels to said transform via a correlation function; and
   selecting a kernel with a highest correlation relative to said transform of said power spectrum as a selected estimated kernel which is applied in order to estimate said motion blur.

2. The method of claim 1 further comprising de-blurring said image with respect to a moving object utilizing said selected estimated kernel with said highest correlation, generating a motion blur corrected image.

3. The method of claim 1 further comprising determining said plurality of kernels for a plurality of regions associated with said image.

4. The method of claim 1 further comprising modeling said at least one modulation transfer function and empirically characterizing said plurality of kernels.

5. The method of claim 2 further comprising estimating said plurality of kernels based on velocity and acceleration associated with said moving object.

6. The method of claim 1 wherein said transform comprises a radon transform.

7. The method of claim 1 wherein said motion blur with respect to said image comprises a one-dimensional motion.

8. A system for estimating motion blur, said system comprising:
   a processor;
   a data bus coupled to said processor; and
   a computer-usable medium embodying computer code, said computer-usable medium being coupled to said data bus, said computer program code comprising instructions executable by said processor and configured for:
      detecting a direction of a motion blur with respect to an image by inspecting a power spectrum associated with said image;
      computing a transform with respect to said power spectrum in said direction of said motion blur;
      estimating a plurality of kernels with respect to said motion blur according to a shutter triggering sequence associated with an image capturing device and modeling said plurality of kernels utilizing at least one modulation transfer function;
      comparing said at least one modulation transfer function associated with said plurality of kernels to said transform via a correlation function; and
      selecting a kernel with a highest correlation relative to said transform of said power spectrum as a selected estimated kernel which is applied in order to estimate said motion blur.

9. The system of claim 8 wherein said instructions are further configured for de-blurring said image with respect to a moving object utilizing said selected estimated kernel with said highest correlation, generating a motion blur corrected image.

10. The system of claim 8 wherein said instructions are further configured for determining said plurality of kernels for a plurality of regions associated with said image.

11. The system of claim 8 wherein said instructions are further configured for modeling said at least one modulation transfer function and empirically characterizing said plurality of kernels.

12. The system of claim 9 wherein said instructions are further configured for estimating said plurality of kernels based on velocity and acceleration associated with said moving object.

13. The system of claim 8 wherein said transform comprises a radon transform.

14. The system of claim 8 wherein said motion blur with respect to said image comprises a one-dimensional motion.

15. A non-transitory computer-usable medium for estimating motion blur, said computer-usable medium embodying computer program code, said computer program code comprising computer executable instructions configured for:
   detecting a direction of a motion blur with respect to an image by inspecting a power spectrum associated with said image;
   computing a transform with respect to said power spectrum in said direction of said motion blur;
   estimating a plurality of kernels with respect to said motion blur according to a shutter triggering sequence associated with an image capturing device and modeling said plurality of kernels utilizing at least one modulation transfer function;
   comparing said at least one modulation transfer function associated with said plurality of kernels to said transform via a correlation function; and
   selecting a kernel with a highest correlation relative to said transform of said power spectrum as a selected estimated kernel which is applied in order to estimate said motion blur.

16. The non-transitory computer-usable medium of claim 15 wherein said embodied computer program code further comprises computer executable instructions configured for comprising de-blurring said image with respect to a moving object utilizing said selected estimated kernel with said highest correlation, generating a motion blur corrected image.

17. The non-transitory computer-usable medium of claim 15 wherein said embodied computer program code further comprises computer executable instructions configured for determining said plurality of kernels for a plurality of regions associated with said image.

18. The non-transitory computer-usable medium of claim 15 wherein said embodied computer program code further comprises computer executable instructions configured for modeling said at least one modulation transfer function and empirically characterizing said plurality of kernels.

19. The non-transitory computer-usable medium of claim 16 wherein said embodied computer program code further comprises computer executable instructions configured for estimating said plurality of kernels based on velocity and acceleration associated with said moving object.

20. The non-transitory computer-usable medium of claim 15 wherein said transform comprises a radon transform and wherein said motion blur with respect to said image comprises a one-dimensional motion.

* * * * *